(12) United States Patent
Randall

(10) Patent No.: US 9,683,545 B2
(45) Date of Patent: Jun. 20, 2017

(54) MANUFACTURE OF WIND TURBINE BLADES

(71) Applicant: Vestas Wind Systems A/S, Aarhus N. (DK)

(72) Inventor: Stephen Randall, Hampshire (GB)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 14/404,372

(22) PCT Filed: May 28, 2013

(86) PCT No.: PCT/DK2013/050161
§ 371 (c)(1),
(2) Date: Nov. 26, 2014

(87) PCT Pub. No.: WO2013/178228
PCT Pub. Date: Dec. 5, 2013

(65) Prior Publication Data
US 2015/0226178 A1    Aug. 13, 2015

Related U.S. Application Data

(60) Provisional application No. 61/653,451, filed on May 31, 2012.

(30) Foreign Application Priority Data

May 31, 2012    (DK) .................................. 2012 70291

(51) Int. Cl.
*B29C 70/68*    (2006.01)
*F03D 1/00*    (2006.01)
(Continued)

(52) U.S. Cl.
CPC .............. *F03D 1/001* (2013.01); *B29C 70/34* (2013.01); *B29C 70/68* (2013.01);
(Continued)

(58) Field of Classification Search
CPC ..... B29C 70/34; B29C 70/68; B29D 99/0025; B29L 2031/085
See application file for complete search history.

(56) References Cited

U.S. PATENT DOCUMENTS

2009/0169392 A1    7/2009    Kuroiwa et al.
2010/0062238 A1*   3/2010    Doyle .................... B29C 70/02
                                                          428/295.1
(Continued)

FOREIGN PATENT DOCUMENTS

EP    1880833 A1    1/2008
EP    2368699 A1    9/2011

OTHER PUBLICATIONS

Danish Patent Office, combined Search and Examination Report issued in corresponding Danish Patent Application No. PA 2012 70291 dated Jan. 10, 2013, 4 pages.
(Continued)

*Primary Examiner* — Christopher Schatz
(74) *Attorney, Agent, or Firm* — Wood Herron & Evans LLP

(57) ABSTRACT

A structural shell for a wind turbine blade is formed from one or more elongate reinforcing members, each in the form of a stack (3) of pultruded fibrous composite strips positioned between two layers of structural foam (4). The foam layers (4) have a thickness which is greater than that of the stack (3). The edges of the foam layers (4) are formed with a void (11). With the stack (3) and foam layers (4) positioned in a mould, a strip of pre-cured glass fibre (5) is placed on the stack (3) and the edges of the foam layers (4). A vacuum
(Continued)

Figure 1A:
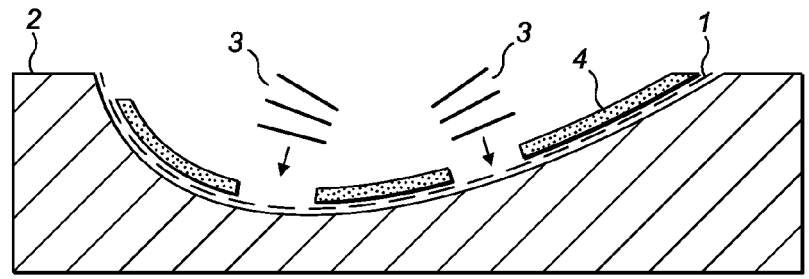

is applied to the stack (3) and the foam layers (4), causing the glass fibre strip (5) to press on the stack (3) and foam layers (4) and to conform to the underlying surfaces. As a result, the void (11) is reduced in size and the step-shaped transition between the surfaces of the stack (2) and the foam layers (4) transformed into a smooth transition, so as to reduce the stresses within the glass fibre strip (5) in the region of the abutment of the stack (3) and the foam layers (4). In other embodiments, the stepped transition is smoothened by replacing the upper-edge region of each foam layer (4) with a strip of low-stiffness foam.

15 Claims, 4 Drawing Sheets

(51) Int. Cl.
| | |
|---|---|
| *B29D 99/00* | (2010.01) |
| *F03D 1/06* | (2006.01) |
| *B29C 70/34* | (2006.01) |
| *F03D 13/10* | (2016.01) |
| *B29L 31/08* | (2006.01) |
| *B29K 63/00* | (2006.01) |
| *B29K 105/08* | (2006.01) |
| *B29K 309/08* | (2006.01) |

(52) U.S. Cl.
CPC ....... *B29D 99/0025* (2013.01); *F03D 1/0675* (2013.01); *F03D 13/10* (2016.05); *B29K 2063/00* (2013.01); *B29K 2105/089* (2013.01); *B29K 2309/08* (2013.01); *B29L 2031/085* (2013.01); *Y02E 10/721* (2013.01); *Y02P 70/523* (2015.11); *Y10T 156/10* (2015.01)

(56) References Cited

U.S. PATENT DOCUMENTS

2010/0260612 A1   10/2010   Vasudeva et al.
2012/0082554 A1   4/2012   Baker et al.

OTHER PUBLICATIONS

International Searching Authority, Search Report and Written Opinion issued in corresponding International Application No. PCT/DK2013/050161 dated Aug. 30, 2013, 11 pages.

\* cited by examiner

MANUFACTURE OF WIND TURBINE BLADES

TECHNICAL

The present invention relates to methods of manufacturing wind turbine blades, and in particular to the manufacture of outer shells of such blades which are formed from different components which abut each other within the shell structure.

BACKGROUND

Figure 1B:
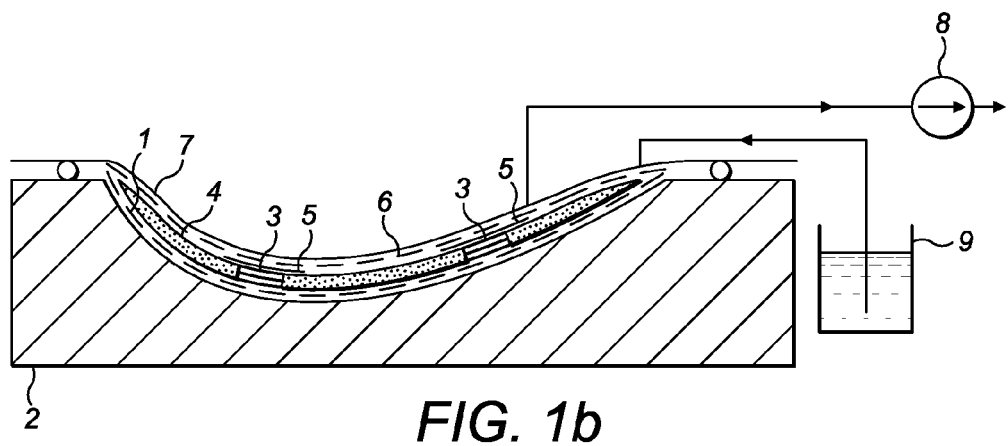

FIGS. 1(a) and 1(b) illustrate a known method of manufacturing shells for wind turbine blades. Referring to FIG. 1(a), a first layer 1 of dry glass fibre fabric is laid on the surface of a lower half-mould 2, and this will form an outer skin 1 of a half-shell of a wind turbine blade. Two stacks 3 of pultruded fibrous composite strips are introduced into channels formed between layers 4 of structural foam, as indicated by the arrows in the drawing. The stacks form the spar caps of the wind turbine blade.

Referring to FIG. 1(b), strips of pre-cured glass fibre epoxy resin composite 5 are then placed along the surfaces of the stacks 3 so that they cover not only the stacks 3 but also the margins of the foam layers 4. In this way, the interfacial regions of the stacks 3 and the foam layers 4 are protected by the glass fibre strips 5. A second layer 6 of dry glass fibre fabric is then placed over the surfaces of the strips 5 and this second glass fibre layer 6 will form an inner skin 6 of a lower half-shell of the wind turbine blade.

For the sake of conciseness, the pre-cured glass fibre epoxy resin composite material is referred to below simply as glass fibre.

An air-tight sealing layer 7 in the form of a vacuum bag is then attached to the half-mould 2 so as form an evacuation chamber encapsulating all of the components, and the chamber is then evacuated using a vacuum pump 8. This causes the second glass fibre layer 6 to press on the upper surfaces of the glass fibre strips 5 and the foam layers 4.

With the pump 8 still energised, a supply 9 of liquid resin is connected to the chamber so as to infuse the components and the interstitial spaces therebetween. The half-mould 2 is then heated so as to cure the composite materials. Resin film may also be placed between the pultruded fibrous composite strips when the stacks 3 are placed in the mould to aid the adhesion between the strips.

The sealing layer 7 is then removed, and a respective elongate web (not shown) is positioned on the surface of the inner skin 6 at a position above each of the stacks 3.

A corresponding process is applied to the components of an upper half of the shell within a further half-mould which is substantially identical to the half-mould 2. The pump 8 continues to operate during a subsequent moulding operation in which the mould halves are heated so as to cure the resin, although during the curing process the extent of de-pressurisation may be lowered. The upper half-mould is then pivoted into position above the half-mould 2, and the two half-moulds are joined together.

During manufacture, the tolerances of the thicknesses of the abutting stacks 3 and the foam layers 4 are such that it is not always possible to match the thicknesses. This can result in step-shaped discontinuities along the inner circumferential surfaces of the shells. When covered with the second glass fibre layer 6, these discontinuities can lead to undesirable cracking of both the glass fibre strips 5 and the second glass fibre layer 6 when the wind turbine blade is subjected to fatigue load.

Figure 2A:
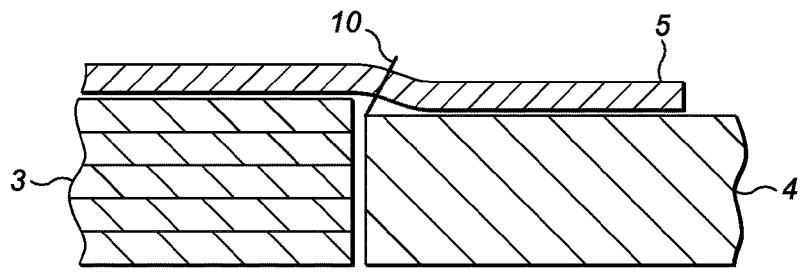
Figure 2B:
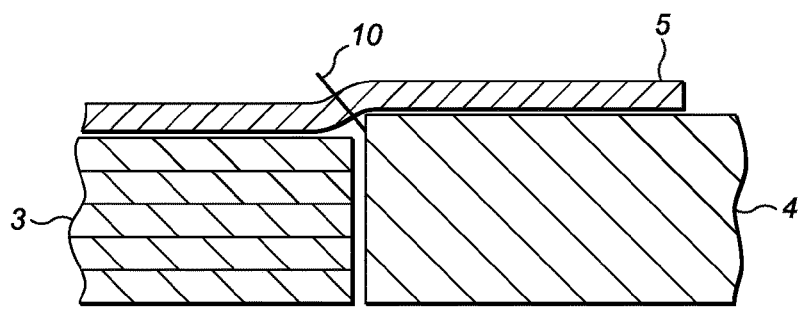

This problem is illustrated in FIGS. 2(a) and 2(b), in which, for the sake of clarity, the second glass fibre layer 6, the outer skin 1 and the half-mould 2 are omitted and the components are not drawn to scale. FIG. 2(a) illustrates the case where the thickness of the foam layers 4 is less than that of the stacks 3, and, conversely, FIG. 2(b) illustrates the case where the thickness of the foam layers 4 is greater than that of the stacks 3.

This difference in the thickness of the stacks 3 and the foam layers 4 has been found to give rise to undesirable stresses within the glass fibre strips 5 along the lines 10, which can result in fracture of the glass fibre strips 5, with resulting instability in the wind turbine blade. Corresponding stresses and fractures could also result in the second glass fibre layer 6.

It would therefore be desirable to provide a method of making such wind turbine blades which overcomes, or at least mitigates, this problem.

SUMMARY

Thus, in accordance with the present invention there is provided a method of smoothing a transition between discontinuous surfaces of first and second adjacent structural components of a wind turbine blade, the method comprising: creating a compressible structure at a boundary of the first and second components; applying a layer of material on the surface of the compressible structure and at least a part of the adjacent surfaces of the first and second components; and applying pressure to the layer of material against the compressible structure, thereby to smooth the transition between the surfaces of the first and second structural components.

The expression "adjacent" is intended to convey the relative positions of the two components and is not intended to imply that the two components are necessarily in physical contact with each other. However, in some embodiments, the two components are indeed in physical contact.

In this way, it is possible to achieve a smoother surface in which any initial step-shaped discontinuities have been either reduced in extent or fully removed.

The structure is preferably sufficiently compressible and the applied pressure sufficient for the surface of the first component to be substantially continuous with that of the second component.

The expression "substantially continuous" is here intended to mean that there is no step-shaped discontinuity between the surfaces of the first and second components, although there could still be discontinuities in the gradient of the surfaces at the region of the abutment.

The layer of material preferably comprises pre-cured fibre resin composite. Preferably the layer of material is pre-cured glass fibre epoxy resin composite.

In one embodiment, the step of creating a compressible structure comprises forming an edge of the first component with a collapsible void.

The collapsible void may be formed by cutting the first component, or alternatively by moulding the first component into a shape which includes the void.

In this case, the layer of material covers the region of the abutment of the first and second components and functions to provide additional bending stiffness, ensuring that the collapsible void does not close fully, thereby giving rise to a smooth continuous surface within the wind turbine blade.

The collapsible void is preferably located substantially mid-way along the thickness direction of the first component, since this resulting thickness of the remaining parts of the first component on either side of the void enables the first component to retain sufficient strength in use of the wind turbine blade.

The collapsible void preferably defines a volume having a cross-sectional area which increases towards the abutment between the first and second components. In this way, the transition between the surfaces of the first and second components is made smooth.

The collapsible void is preferably in the shape of an elongate groove or wedge, e.g. of substantially triangular cross-section in which the triangle has two relatively long sides which extend from an apex within the first component to a base at the edge of the first component where it abuts the second component.

In an alternative embodiment, the step of creating a compressible structure comprises providing a compressible material between the first and second components.

In this case, the compressible material may be provided within a recess formed along a side edge of the first component.

Alternatively, the compressible material may have an uncompressed thickness equal to that of the first component. In this case, the first and second structural components do not abut each other but are separated by a channel which is filled with the compressible material.

The compressible material may comprise low-stiffness foam.

The pressure may be applied to the surface of the first component by applying a vacuum to the underside of the layer of material, such that atmospheric pressure acts on the surface of the first component.

One of the structural components may comprise an elongate reinforcing structure. This is preferably a spar cap integrated in the shell of a wind turbine blade and will provide the wind turbine blade with sufficient strength without requiring a separate inner spar.

Such an elongate reinforcing structure may take the form of a stack of layers each of which comprises one or more pultruded fibrous composite strips, which advantageously contain carbon fibres.

The resulting wind turbine blade may be formed from two opposing half-shells, each half-shell comprising an inner skin and an outer skin, the elongate reinforcing structures being located between the inner and outer skins, which are preferably made from a glass fibre fabric.

With this arrangement, each half-shell can be formed separately and cured by heating, and then the two cured shell halves are joined together with adhesive.

The reinforcing structures thus act as spar caps in the wind turbine blade, and the blade may comprise at least one elongate web located between the reinforcing structures within the opposing half-shells so as to transfer shear forces acting on the wind turbine blade in use.

One of the structural components comprises a layer of structural foam. In the preferred embodiment, the structural foam is part of a sandwich panel region which extends over most of the inner surface of the wind turbine blade, interrupted only by the reinforcing structures. The structural foam may be PET foam.

It is preferred that the first component comprises the layer of structural foam, since it is relatively easy to machine structural foam so as to form the void.

The invention extends to a method of manufacturing a wind turbine blade incorporating one of the above methods.

BRIEF DESCRIPTIONS OF THE DRAWINGS

Figure 3A:
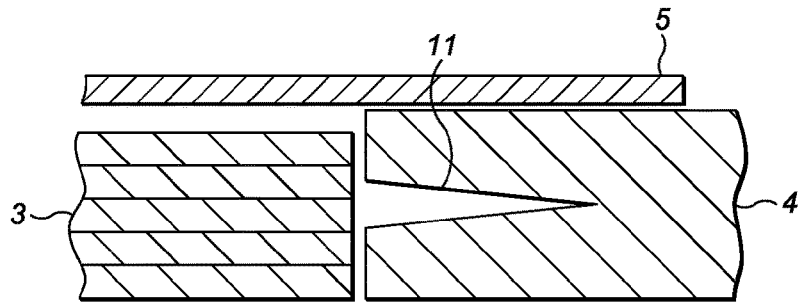
Figure 3B:
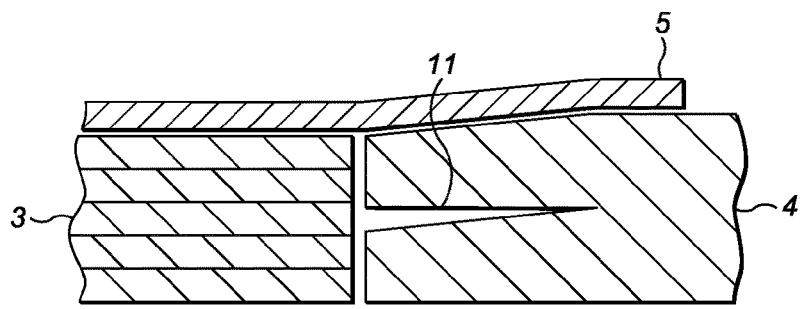
Figure 4A:
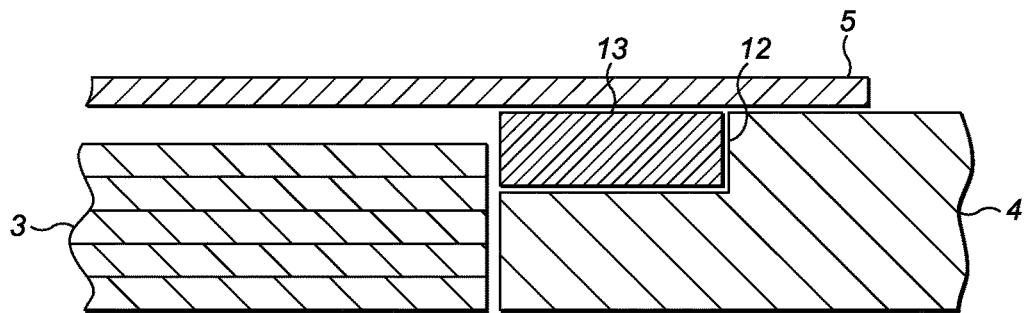
Figure 4B:
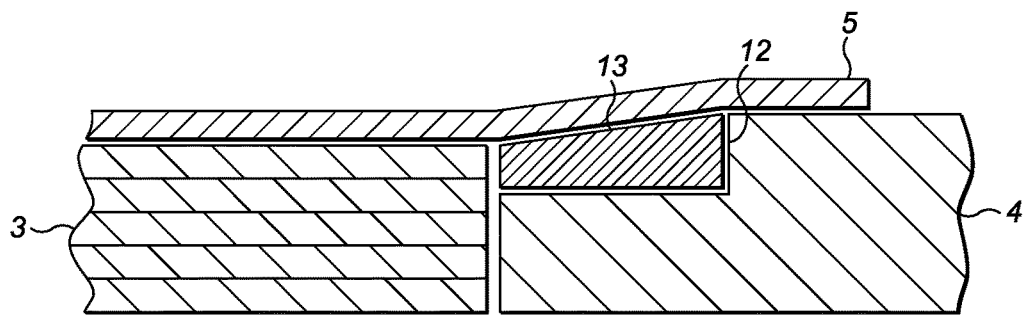
Figure 5A:
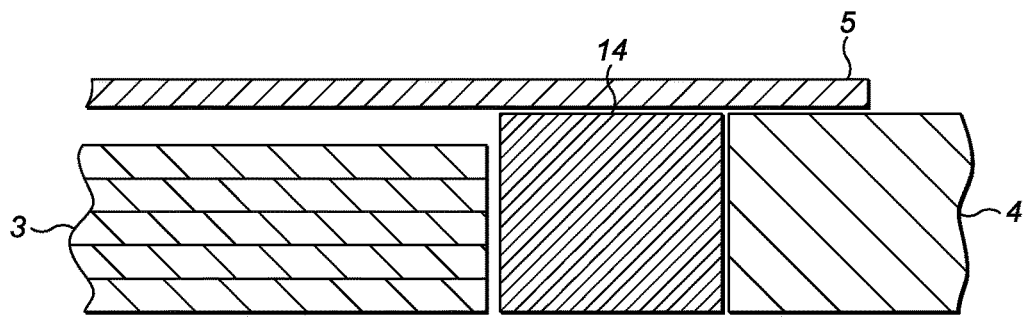
Figure 5B:
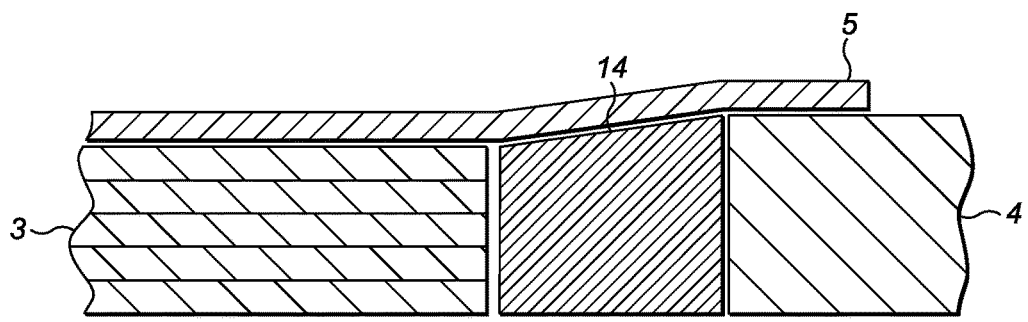
Figure 6:
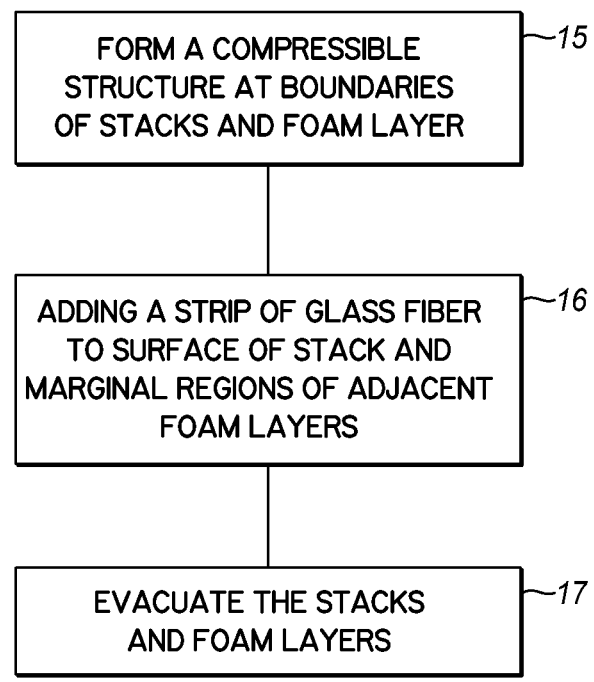

Preferred embodiments of the present invention will now be descried with reference to the accompanying drawings, in which:

FIGS. 1(a) and 1(b) illustrate a known method of manufacturing a wind turbine blade in accordance with a preferred embodiment of the present invention;

FIGS. 2(a) and 2(b) are schematic cross-sectional views of a part of a wind turbine blade shell manufactured using the method illustrated in FIGS. 1(a) and 1(b), illustrating the problem of cracking with the conventional arrangement;

FIGS. 3(a) and 3(b) are schematic cross-sectional views of the part of the wind turbine blade illustrated in FIGS. 2(a) and 2(b) illustrating a method in accordance with a first preferred embodiment of the present invention;

FIGS. 4(a) and 4(b) are schematic cross-sectional views of the part of the wind turbine blade illustrated in FIGS. 2(a) and 2(b) illustrating a method in accordance with a second preferred embodiment of the present invention;

FIGS. 5(a) and 5(b) are schematic cross-sectional views of the part of the wind turbine blade illustrated in FIGS. 2(a) and 2(b) illustrating a method in accordance with a third preferred embodiment of the present invention;

FIG. 6 is a flowchart illustrating the steps of the method of a preferred embodiment of the present invention.

DETAILED DESCRIPTION OF THE DRAWINGS

Where appropriate, the same reference numerals have been used throughout the drawings to refer to the same, or similar, elements.

In FIGS. 3(a) and 3(b) a method is illustrated in accordance with a first preferred embodiment of the present invention. As with FIGS. 2(a) and 2(b), the outer skin 1, the second glass fibre layer 6 and the half-mould 2 are not shown in the drawings, and components are not drawn to scale, for the sake of clarity. As can be seen from these drawings, the foam layers 4 are formed with a thickness which is sufficiently greater than that of the stacks 3 such that, allowing for manufacturing tolerances of the stacks 3, the thickness of the foam layers 4 will always be greater than that of the stacks 3.

A wedge-shaped void 11 is cut out of the edges of the foam layers 4, or alternatively the foam layers 4 are moulded with the voids 11 already formed therein. As with the conventional arrangement described above, the stacks 3 and the foam layers 4 are positioned with their side edges abutting on a first glass fibre layer 1 on the surface of a half-mould 2, and a strip of glass fibre 5 is placed along the surfaces of the stacks 3 and the edges of the foam layers 4, so as to cover the region of abutment of the stacks 3 and the foam layers 4.

As described above with reference to FIGS. 1(a) and 1(b), a second layer of glass fibre 6 is then laid over the surface of the glass fibre strips 5 and the exposed surfaces of the foam 4, and an air-tight sealing bag 7 is placed over the surface of the second glass fibre layer 6. The resulting chamber is evacuated, such that atmospheric pressure causes both the strips of glass fibre 5 and the second glass fibre layer 6 to press against the surfaces of the stacks 3 and the foam layers 4 until they conform to the shape of the underlying surfaces. As can be seen from a comparison of FIG. 3(a) and FIG. 3(b), the wedge-shaped void 11 is reduced in size and the step-shaped transition between the surfaces of the stacks 3 and the foam layers 4 of FIG. 3(a) has been transformed into a smooth transition, thereby substantially reducing the resulting curvature of the glass fibre composite strips 5 in the region of the abutment of the stacks 3 and the foam layers 4. The composite materials are then cured by infusing resin into the half-mould 2, and the subsequent procedures are as described above.

In FIGS. 4(*a*) and 4(*b*) a second embodiment of the invention is illustrated. As before, the outer skin 1, the second glass fibre layer 6 and the half-mould 2 are omitted, and the components are not drawn to scale, for the sake of clarity. As with the first embodiment, the foam layers 4 are formed with a thickness which is sufficiently greater than that of the stacks 3 such that, allowing for manufacturing tolerances of the stacks 3, the thickness of the foam layers 4 will always be greater than that of the stacks 3.

A region of the foam layer 4 having a rectangular cross section is cut out of each edge of the foam layers 4, so as to form a shelf 12. Alternatively the foam layers 4 are moulded with the shelves 12 already formed. The stacks 3 and the foam layers 4 are positioned, with their side edges abutting, on a first glass fibre layer 1 on the surface of a half-mould 2, and a strip of relatively low-stiffness foam 13 (compared to the foam layer 4) is then placed along each shelf 12. A strip of glass fibre 5 is then placed along the surfaces of each stack 3 and its adjoining low-stiffness foam strips 13 and the edges of the adjacent foam layers 4.

The subsequent procedure is identical to that of the first embodiment. As can be seen from a comparison of FIGS. 4(*a*) and FIG. 4(*b*), the low-stiffness foam strip 13 has been compressed such that it exhibits a substantially trapezoidal cross section, and the previous step-shaped transitions between the surfaces of the stacks 3 and the foam strips 13 of FIG. 4(*a*) have been smoothened, thereby substantially reducing the resulting curvature of the glass fibre composite strips 5 in the region of the abutment of the stacks 3 and the foam layers 4.

In FIGS. 5(*a*) and 5(*b*) a third embodiment of the invention is illustrated. In this embodiment, the stacks 3 and the foam layers 4 no longer directly abut each other, but are separated by respective channels into each of which is inserted an elongate strip of low-stiffness foam 14. By comparing FIG. 4(*a*) and FIG. 4(*b*), it can be seen that the step-shaped transition between the surface of the stacks 3 and the low-stiffness foam strips 14 of FIG. 4(*a*) has been smoothened.

In each of the above embodiments, the glass fibre strips 5 are intended to cover the regions where the strips 3 adjoin the foam layers 4. Although each glass fibre strip 5 may extend across the entire width of each stack 3 and over the marginal regions of the foam layers 4, the strips 5 may alternatively extend only over the edge regions of each stack 3.

Suitable foams that may be used are PET foam or PVC foam. In other embodiments, balsa wood may be used in place of foam to create the sandwich structure.

The method of the preferred embodiment is summarised in the flowchart of FIG. 6, in which a compressible structure is formed at the boundaries of the stacks and the foam layers. A strip of glass fibre is then applied to the surface of each stack and the marginal regions of the adjacent foam layers in step 16. Finally, the stacks and the foam layers are evacuated in step 17 so as to cause the strip of glass fibre under atmospheric pressure to conform to the underlying surfaces of the stacks and the foam layers.

The invention claimed is:

1. A method of smoothing a transition between discontinuous surfaces of first and second adjacent structural components of a wind turbine blade, the method comprising:
   creating a compressible structure at a boundary of the first and second components, wherein the compressible structure is relatively more compressible than portions of the first and second components adjacent the compressible structure;
   applying a layer of material on a surface of the compressible structure and at least a part of adjacent surfaces of the first and second components; and
   applying pressure to the layer of material against the compressible structure, thereby to smooth the transition between the surfaces of the first and second structural components,
   wherein the step of creating the compressible structure comprises forming an edge of the first component with a collapsible void.

2. A method as claimed in claim 1, wherein the structure is sufficiently compressible and the applied pressure sufficient for the surface of the first component to be substantially continuous with that of the second component.

3. A method as claimed in claim 1, wherein the layer of material comprises pre-cured fibre resin composite.

4. A method as claimed in claim 1, wherein the collapsible void is located substantially mid-way along a thickness direction of the first component.

5. A method as claimed in claim 1, wherein the collapsible void defines a volume having a cross-sectional area which increases towards an abutment of the first and second components.

6. A method as claimed in claim 5, wherein the collapsible void is in the shape of wedge.

7. A method as claimed in claim 1, wherein the pressure is applied by means of a vacuum.

8. A method as claimed in claim 1, wherein one of the structural components comprises an elongate reinforcing structure.

9. A method as claimed in claim 8, wherein the elongate reinforcing structure comprises a stack of layers each comprising at least one pultruded fibrous composite strip.

10. A method as claimed in claim 1, wherein one of the structural components comprises a layer of structural foam.

11. A method as claimed in claim 10, wherein the first component comprises the layer of structural foam.

12. A method of smoothing a transition between discontinuous surfaces of first and second adjacent structural components of a wind turbine blade, the method comprising:
   creating a compressible structure at a boundary of the first and second components;
   applying a layer of material on a surface of the compressible structure and at least a part of adjacent surfaces of the first and second components; and
   applying pressure to the layer of material against the compressible structure, thereby to smooth the transition between the surfaces of the first and second structural pg,14 components, wherein the step of creating the compressible structure comprises forming an edge of the first component with a collapsible void.

13. A method as claimed in claim 12, wherein forming an edge of the first component with the collapsible void comprises cutting the first component.

14. A method as claimed in claim 12, wherein the collapsible void defines a volume having a cross-sectional area which increases towards an abutment of the first and second components.

15. A method as claimed in claim 14, wherein the collapsible void is in the shape of a wedge.

\* \* \* \* \*